US012469225B2

United States Patent
Liu

(10) Patent No.: US 12,469,225 B2
(45) Date of Patent: Nov. 11, 2025

(54) INFORMATION PROMPT METHOD AND APPARATUS IN VIRTUAL SCENE, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 398 days.

(21) Appl. No.: 17/946,626

(22) Filed: Sep. 16, 2022

(65) Prior Publication Data

US 2023/0015409 A1 Jan. 19, 2023

Related U.S. Application Data

(63) Continuation of application No. PCT/CN2021/112200, filed on Aug. 12, 2021.

(30) Foreign Application Priority Data

Sep. 17, 2020 (CN) .......................... 202010977624.4

(51) Int. Cl.
*G06T 19/00* (2011.01)
*G06T 7/70* (2017.01)
(Continued)

(52) U.S. Cl.
CPC .............. *G06T 19/006* (2013.01); *G06T 7/70* (2017.01); *G06T 17/05* (2013.01); *G06T 19/20* (2013.01);
(Continued)

(58) Field of Classification Search
CPC ......... G06T 19/006; G06T 7/70; G06T 17/05; G06T 19/20; G06V 10/761; G06V 2201/07
(Continued)

(56) References Cited

U.S. PATENT DOCUMENTS

2014/0038708 A1 2/2014 Davison et al.
2018/0350144 A1* 12/2018 Rathod .............. G06Q 20/3224
(Continued)

FOREIGN PATENT DOCUMENTS

CN 108014495 A 5/2018
CN 111265869 A * 6/2020 ......... A63F 13/5372
(Continued)

OTHER PUBLICATIONS

China National Intellectual Property Administration (CNIPA) Office Action 1 for 202010977624.4 Sep. 18, 2021 10 Pages (including translation).
(Continued)

*Primary Examiner* — Wednel Cadeau
(74) *Attorney, Agent, or Firm* — ANOVA LAW GROUP PLLC

(57) ABSTRACT

The present disclosure provides an information prompt method and apparatus in a virtual scene, an electronic device, and a computer-readable storage medium. The method includes: presenting a sensing function control in a picture of the virtual scene; determining a sensing region with a first virtual object as a center in response to a trigger operation for the sensing function control; and when there is at least one second virtual object located in the sensing region, outputting prompt information of an orientation of the at least one second virtual object relative to the first virtual object.

16 Claims, 11 Drawing Sheets

(51) Int. Cl.
  *G06T 17/05* (2011.01)
  *G06T 19/20* (2011.01)
  *G06V 10/74* (2022.01)
(52) U.S. Cl.
  CPC ........ *G06V 10/761* (2022.01); *G06V 2201/07* (2022.01)
(58) Field of Classification Search
  USPC .......................................................... 382/154
  See application file for complete search history.

(56) References Cited

U.S. PATENT DOCUMENTS

2019/0076739 A1    3/2019  Ge
2021/0370170 A1*  12/2021  Li ........................ G06F 3/04815

FOREIGN PATENT DOCUMENTS

CN    111408133 A    7/2020
CN    112090069 A   12/2020

OTHER PUBLICATIONS

The World Intellectual Property Organization (WIPO) International Search Report for PCT/CN2021/112200 Nov. 1, 2021 8 Pages (including translation).

* cited by examiner

INFORMATION PROMPT METHOD AND APPARATUS IN VIRTUAL SCENE, ELECTRONIC DEVICE, AND STORAGE MEDIUM

CROSS-REFERENCES TO RELATED APPLICATIONS

This application is a continuation application of PCT Patent Application No. PCT/CN2021/112200, entitled "INFORMATION PROMPTING METHOD AND APPARATUS IN VIRTUAL SCENE, ELECTRONIC DEVICE, AND STORAGE MEDIUM" and filed on Aug. 12, 2021, which claims priority to Chinese Patent Application No. 202010977624.4, filed on Sep. 17, 2020, the entire contents of both of which are incorporated herein by reference.

FIELD OF THE TECHNOLOGY

The present disclosure relates to the field of virtualization and human-machine interaction technologies, and in particular, to an information prompt method and apparatus in a virtual scene, an electronic device, and a computer-readable storage medium.

BACKGROUND OF THE DISCLOSURE

With the development of computer technology, an electronic device can implement more abundant and vivid virtual scenes. A virtual scene refers to a digital scene outlined by a computer through digital communication technology. A user can obtain a fully virtualized experience (such as virtual reality) or a partially virtualized experience (such as augmented reality) in the virtual scene in terms of vision, hearing, or the like. In addition, the user can interact with various objects in the virtual scene, or control various objects in the virtual scene to perform interaction to obtain feedback.

With the increasing development of the virtual scene, virtual objects in the virtual scene also become increasingly complex and diverse. In the related art, when controlling the virtual object to interact with other virtual objects, the user needs to perform human-machine interaction operations such as dragging and moving a plurality of times to adjust a current display field of view, so as to observe positions of the other virtual objects that appear nearby, resulting in low efficiency of human-machine interaction and waste of hardware processing resources.

SUMMARY

Embodiments of the present disclosure provide an information prompt method and apparatus, an electronic device, and a computer-readable storage medium in a virtual scene, which can prompt a user about orientations of other virtual interactive objects in the virtual scene, and improve the efficiency of human-machine interaction.

The technical solutions in the embodiments of the present disclosure are implemented as follows:

An embodiment of the present disclosure provides an information prompt method in a virtual scene, performed by a terminal, the method including: presenting a sensing function control in a picture of the virtual scene; determining a sensing region with a first virtual object as a center in response to a trigger operation for the sensing function control; and when there is at least one second virtual object located in the sensing region, outputting prompt information of an orientation of the at least one second virtual object relative to the first virtual object.

An embodiment of the present disclosure further provides an electronic device, including: a memory, configured to store computer-executable instructions; and a processor, configured, when executing the computer-executable instructions stored in the memory, to implement: presenting a sensing function control in a picture of the virtual scene; determining a sensing region with a first virtual object as a center in response to a trigger operation for the sensing function control; and when there is at least one second virtual object located in the sensing region, outputting prompt information of an orientation of the at least one second virtual object relative to the first virtual object.

An embodiment of the present disclosure further provides a non-transitory computer-readable storage medium storing computer-executable instructions, the computer-executable instructions, when executed by a processor, implementing the information prompt method in a virtual scene provided in this embodiment of the present disclosure.

This embodiment of the present disclosure has the following beneficial effects:

The information prompt method and apparatus, an electronic device, and a computer-readable storage medium in a virtual scene provided in this embodiment of the present disclosure are applied. A sensing function control is presented in the picture of the virtual scene, and when a trigger operation for the sensing function control is received, a sensing region with the first virtual object as the center is determined in response to the trigger operation, so that in response to determining that there is at least one second virtual object located in the sensing region, orientation prompt information of the second virtual object relative to the first virtual object is outputted; and in this way, when the user controls the first virtual object to interact with the second virtual object in the virtual scene, the orientation prompt information can be outputted to the user in response to determining that there is the at least one second virtual object in the sensing region of the first virtual object, so as to prompt the user about the orientation of the second virtual object relative to the first virtual object based on the orientation prompt information. In this way, interaction object is reduced, the efficiency of human-machine interaction is improved, and the occupation of hardware processing resources is reduced.

DESCRIPTION OF EMBODIMENTS

Figure 1:
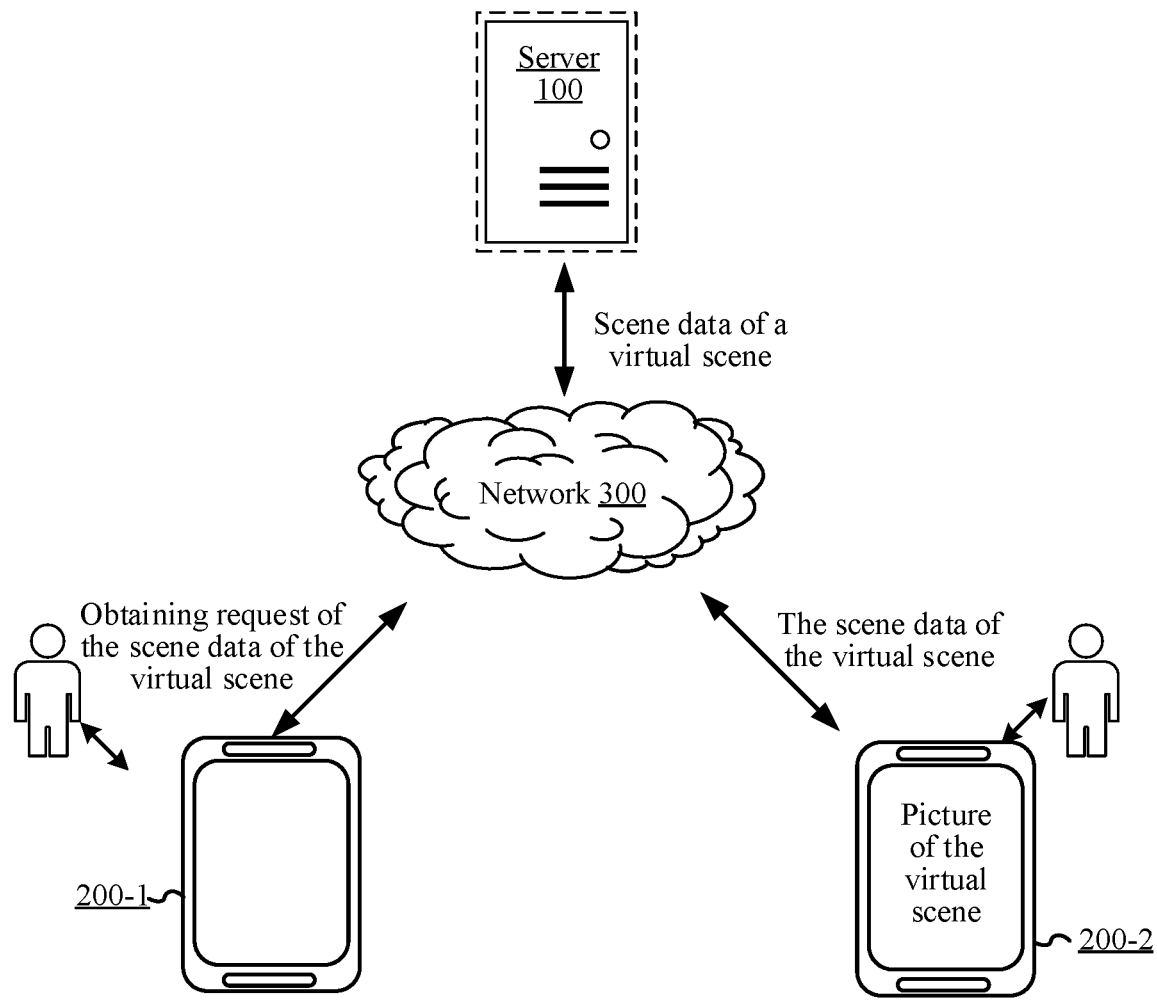
FIG. 1 is a schematic diagram of an implementation scenario of an information prompt method in a virtual scene according to an embodiment of the present disclosure.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of the present disclosure described herein can be implemented in a sequence in addition to the sequence shown or described herein.

Unless otherwise defined, meanings of all technical and scientific terms used in this specification are the same as those usually understood by a person skilled in the art to which the present disclosure belongs. Terms used in this specification are merely intended to describe objectives of the embodiments of the present disclosure, but are not intended to limit the present disclosure.

Before the embodiments of the present disclosure are further described in detail, a description is made on nouns and terms involved in the embodiments of the present disclosure, and the nouns and terms involved in the embodiments of the present disclosure are applicable to the following explanations.

1) "In response to" is used for representing a condition or status on which one or more operations to be performed depend. When the condition or status is satisfied, the one or more operations may be performed immediately or after a set delay. Unless explicitly stated, there is no limitation on the order in which the plurality of operations are performed.

2) Client is an application run on a terminal that is configured to provide various services, such as a video playback client, a game client, or the like.

3) Virtual scene is a virtual scene displayed (or provided) when an application is run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of the present disclosure. For example, the virtual scene may include the sky, the land, the ocean, or the like. The land may include environmental elements such as the desert and a city. The user may control the virtual object to move in the virtual scene.

4) Virtual objects are images of various people and objects that can interact in a virtual scene, or movable objects in the virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

In some embodiments, the virtual object may be a player character controlled through an operation on a client, or may be an artificial intelligence (AI) character set in a virtual scene battle through training, or may be a non-player character (NPC) set in a virtual scene interaction. In some embodiments, the virtual object may be a virtual character for performing adversarial interaction in a virtual scene. In some embodiments, a quantity of virtual objects participating in the interaction in the virtual scene may be preset, or may be dynamically determined according to a quantity of clients participating in the interaction.

For example, using a shooting game as an example, the user may control the virtual object to fall freely, glide, open a parachute to fall, or the like in the sky of the virtual scene, or run, jump, crawl, bend forward, or the like on the land, or swim, float, dive, or the like in the ocean. Certainly, the user may alternatively control the virtual object to drive a virtual vehicle to move in the virtual scene. For example, the virtual vehicle may be a virtual car, a virtual aircraft, a virtual yacht, or the like. The foregoing scene is merely used as an example for description, and this is not specifically limited in the embodiments of the present disclosure. The foregoing scenarios are used as an example only herein, which is not specifically limited in this embodiment of the present disclosure. The user may also control the virtual object to interact adversarially with other virtual objects through a virtual prop. For example, the virtual prop may be a throwing virtual prop such as a grenade, a cluster mine, or a sticky grenade, or a shooting virtual prop such as a machine gun, a pistol, or a rifle. Types of the virtual prop are not specifically limited in the present disclosure.

5) Scene data represents various features of the virtual object in the virtual scene in an interaction process, for example, may include a position of the virtual object in the virtual scene. Certainly, different types of features may be included according to the type of the virtual scene; and for example, in the virtual scene of a game, scene data can include a period of time (depending on the number of times the same function can be used in a specific period of time) needs to be waited for various functions configured in the virtual scene, and can further represent attribute values of various states of a game character, such as a health point (also referred to as a hit point) and a magic point (also referred to as a mana point).

Based on the foregoing explanations of nouns and terms involved in this embodiment of the present disclosure, the following describes an implementation scenario of the information prompt method in the virtual scene provided in this embodiment of the present disclosure. FIG. 1 is a schematic diagram of an implementation scenario of an information prompt method in a virtual scene according to an embodiment of the present disclosure. To support an exemplary application, a terminal 200 (including a terminal 200-1 and a terminal 200-2) is connected to a server 100 through a network 300. The network 300 may be a wide area network or a local area network, or a combination of the two, using wireless or wired links for data transmission.

The terminal 200 is configured to receive a trigger operation for entering the virtual scene based on a view interface, and transmit an obtaining request of scene data of the virtual scene to the server 100;

the server 100 is configured to receive the obtaining request of the scene data, and return the scene data of the virtual scene to the terminal 200 in response to the obtaining request; and the terminal 200 is configured to receive the scene data of the virtual scene, render a picture of the virtual scene based on the scene data, and present the picture of the virtual scene, where an object interaction environment and an interaction object can further be presented in the picture of the virtual scene, and content presented in the picture of the virtual scene is obtained based on scene data rendering of the virtual scene that is returned.

The terminal 200 presents a sensing function control in the picture of the virtual scene; determines a sensing region with a first virtual object as a center in response to a trigger operation for the sensing function control; and outputs, when there is at least one second virtual object located in the sensing region, prompt information of an orientation of the at least one second virtual object relative to the first virtual object, so as to prompt the user corresponding to the first virtual object about an orientation in which the second virtual object is located in a current virtual scene, thereby reducing the number of times of interactions required for determining the position of the second virtual object and improving the efficiency of human-machine interaction. Hereinafter, the prompt information of the orientation of the at least one second virtual object relative to the first virtual object can also be referred to as orientation prompt information.

In actual application, the server 100 may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and AI platform. The terminal 200 may be a smartphone, a tablet computer, a notebook computer, a desktop computer, a smart speaker, a smart watch, or the like, but is not limited thereto. The terminal 200 and the server 100 may be directly or indirectly connected in a wired or wireless communication manner, which is not limited in the present disclosure.

In practical applications, an application supporting a virtual scene is installed and run on the first terminal 200. The application may be any one of a first-person shooting (FPS) game, a third-person shooting game, a multiplayer online battle arena (MOBA) game, a two dimension (2D) game application, a three dimension (3D) game application, a virtual reality application, a 3D map program, a battle game simulation program, or a multiplayer gunfight survival game. The application may further be a standalone application program, such as a standalone 3D game program.

The virtual scene involved in this embodiment of the present disclosure may be used for simulating a two-dimensional virtual space or a three-dimensional virtual space. Using a virtual scene simulating a three-dimensional virtual space as an example, the three-dimensional virtual space may be an open space, and the virtual scene may be used for simulating a real environment in reality. For example, the virtual scene may include the sky, the land, and the ocean, and the land may include environment elements such as a desert and cities. Certainly, the virtual scene may further include virtual items, for example, a prop such as a weapon used by a virtual object in a building, a vehicle, and a virtual scene that is needed for arming itself or fighting with other virtual objects. The virtual scene may further be used for simulating a real environment under a different weather, for example, a sunny day, a rainy day, a foggy day, or a dark night. The virtual object may be a virtual image used for representing a user in the virtual scene. The virtual image may be in any form, for example, a simulated character, a simulated animal, or the like, which is not limited in the present disclosure. In actual implementation, the user can control the virtual object to perform a movement in the virtual scene by using the terminal 200. The movement includes, but is not limited to, at least one of body posture adjustment, crawling, walking, running, cycling, jumping, driving, picking, shooting, attacking, and throwing.

Using an electronic game scene as an exemplary scenario, a user may perform an operation on a terminal in advance, and a game configuration file of an electronic game may be downloaded after the terminal detects the operation of the user. The game configuration file may include an application, interface display data, virtual scene data, or the like of the electronic game, so that the user may invoke the game configuration file when logging into the electronic game on the terminal, so as to render and display an electronic game interface. The user may perform a touch operation on the terminal, and after detecting the touch operation, the terminal may determine game data corresponding to the touch operation and render and display the game data. The game data may include virtual scene data, behavioral data of a virtual object in the virtual scene, and the like.

In practical applications, the terminal 200 receives a trigger operation for entering the virtual scene based on a view interface, and transmits an obtaining request of scene data of the virtual scene to the server 100; the server 100 receives the obtaining request of the scene data, and returns the scene data of the virtual scene to the terminal 200 in response to the obtaining request; the terminal 200 receives the scene data of the virtual scene, renders a picture of the virtual scene based on the scene data, and presents the picture of the virtual scene, where the terminal 200 presents a sensing function control in the picture of the virtual scene (such as virtual warning skill chip); determines a sensing region with a first virtual object (that is, a virtual image corresponding to a game player logging in to the video game) as a center in response to a trigger operation for the sensing function control; and outputs, when there is at least one second virtual object (that is, virtual images corresponding to other game players or non-player characters in the electronic game scene) located in the sensing region, prompt information of an orientation of the at least one second virtual object relative to the first virtual object, so as to prompt the game player corresponding to the first virtual object about an orientation in which the second virtual object is located in a current virtual scene, thereby reducing the number of times of interactions required for determining the position of the second virtual object and improving the efficiency of human-machine interaction.

Using a battle game virtual simulation application as an exemplary scene, the virtual scene technology is used to enable trainees to visually and audibly experience a battlefield environment, and to be familiar with environmental features of a battle region. Through a necessary device interacting with objects in the virtual environment, an implementation method of the virtual battlefield environment can create a dangerous and almost real three-dimensional battlefield environment through background generation and image synthesis, and through a corresponding graphic image library of a three-dimensional battlefield environment, including a battle background, a battlefield scene, various weapons and equipment, battle personnel, or the like.

In actual implementation, the terminal 200 receives a trigger operation for entering the virtual scene based on a view interface, and transmits an obtaining request of scene data of the virtual scene to the server 100; the server 100 receives the obtaining request of the scene data, and returns the scene data of the virtual scene to the terminal 200 in response to the obtaining request; the terminal 200 receives the scene data of the virtual scene, renders a picture of the virtual scene based on the scene data, and presents the picture of the virtual scene, where the terminal 200 presents a sensing function control (such as virtual sensing skill chip) in the picture of the virtual scene; determines a sensing region with a first virtual object (for example, simulated battle personnel on our side) as a center in response to a trigger operation for the sensing function control; and outputs, when there is at least one second virtual object (for example, enemy simulated battle personnel corresponding to the simulated battle personnel on our side) located in the sensing region, prompt information of an orientation of the at least one second virtual object relative to the first virtual object, so as to prompt the battle personnel corresponding to the first virtual object about an orientation in which the second virtual object is located in a current virtual scene, thereby reducing the number of times of interactions required for determining the position of the second virtual object and improving the efficiency of human-machine interaction.

Figure 2:
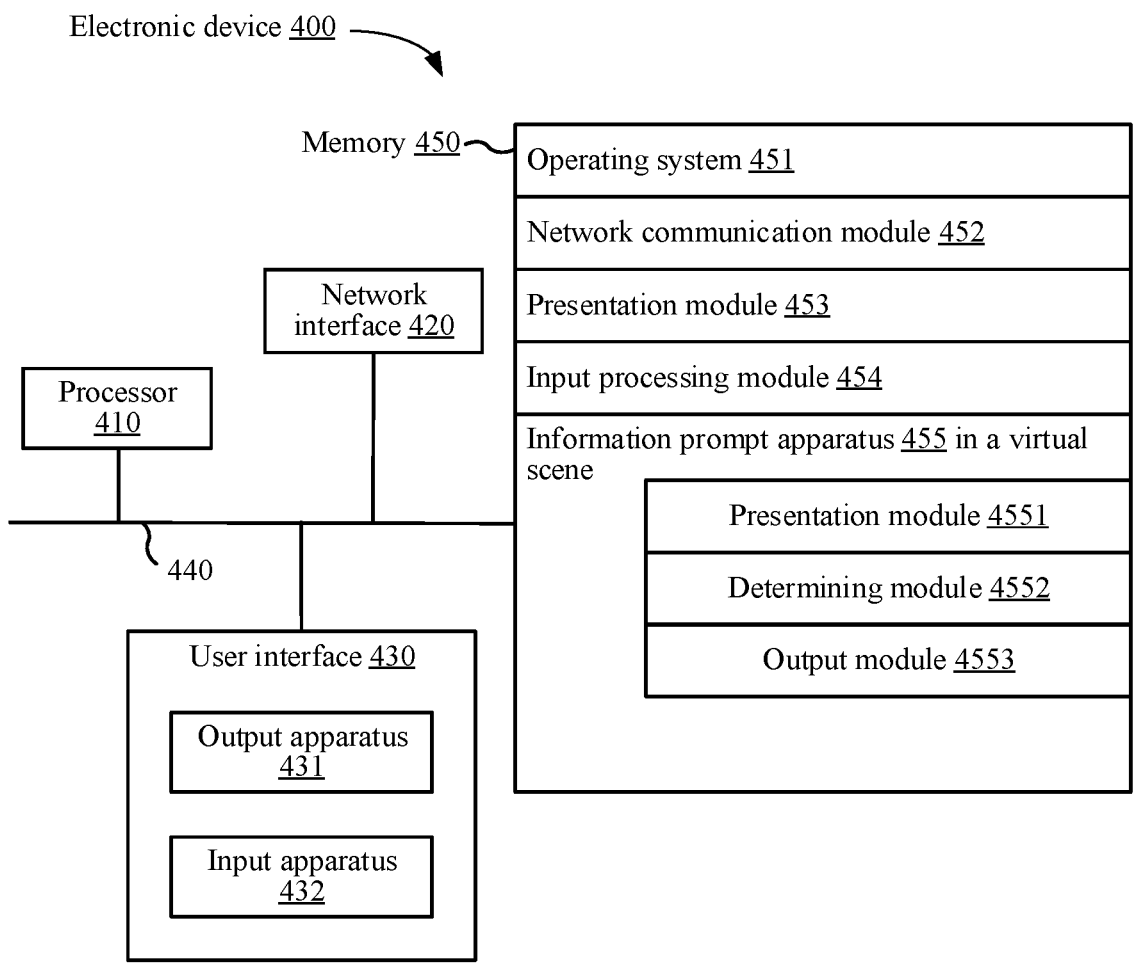
FIG. 2 is a schematic structural diagram of an electronic device according to an embodiment of the present disclosure.

A hardware structure of an electronic device of the information prompt method in a virtual scene provided in this embodiment of the present disclosure is described in detail below, and the electronic device includes but is not limited to a server or a terminal. FIG. 2 is a structural diagram of an electronic device according to an embodiment of the present disclosure. The electronic device 400 shown in FIG. 2 includes: at least one processor 410, a memory 450, at least one network interface 420, and a user interface 430. All the components in the electronic device 400 are coupled together by using a bus system 440. It may be understood that the bus system 440 is configured to implement connection and communication between the components. In addition to a data bus, the bus system 440 further includes a power bus, a control bus, and a status signal bus. However, for ease of clear description, all types of buses in FIG. 2 are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, an existing processor, or the like.

The user interface 430 includes one or more output apparatuses 431 that can display media content, including one or more speakers and/or one or more visual display screens. The user interface 430 further includes one or more input apparatuses 432, including a user interface component helping a user input, for example, a keyboard, a mouse, a microphone, a touch display screen, a camera, or another input button and control member.

The memory 450 may be a removable memory, a non-removable memory, or a combination thereof. Exemplary hardware devices include a solid-state memory, a hard disk drive, an optical disc driver, or the like. The memory 450 may include one or more storage devices physically away from the processor 410.

The memory 450 includes a volatile memory or a non-volatile memory, or may include a volatile memory and a non-volatile memory. The non-volatile memory may be a read-only memory (ROM), and the volatile memory may be a random access memory (RAM). The memory 450 described in the embodiments of the present disclosure is to include any other suitable type of memories.

In some embodiments, the memory 450 can store data to support various operations, and examples of the data include programs, modules, and data structures, or subsets or supersets thereof, as illustrated below.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, wireless compatible authentication (WiFi), a universal serial bus (USB), and the like.

A presentation module 453 is configured to present information by using an output apparatus 431 (for example, a display screen or a speaker) associated with one or more user interfaces 430 (for example, a user interface configured to operate a peripheral device and display content and information); and an input processing module 454 is configured to detect one or more user inputs or interactions from one of the one or more input apparatuses 432 and translate the detected input or interaction.

In some embodiments, the information prompt apparatus in the virtual scene provided in this embodiment of the present disclosure may be implemented by using software. FIG. 2 shows an information prompt apparatus 455 in a virtual scene stored in the memory 450. The information prompt apparatus may be software in a form such as a program or a plug-in, and includes the following software modules: a presentation module 4551, a determining module 4552, and an output module 4553. These modules are logical modules, and therefore may be combined in different manners or further divided according to a function to be implemented, and the function of each module will be described below.

In some other embodiments, a processing apparatus for livestreaming information provided in this embodiment of the application may be implemented by a combination of software and hardware. For example, the processing apparatus of livestreaming information provided in this embodiment of the application may be a processor in a form of a hardware decoding processor, programmed to perform the processing method for livestreaming information provided in the embodiments of the application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

Based on the foregoing description of the implementation scenario of the information prompt method in the virtual scene and the description of the electronic device according to this embodiment of the present disclosure, the following describes the information prompt method in the virtual scene provided in this embodiment of the present disclosure.

Figure 3:
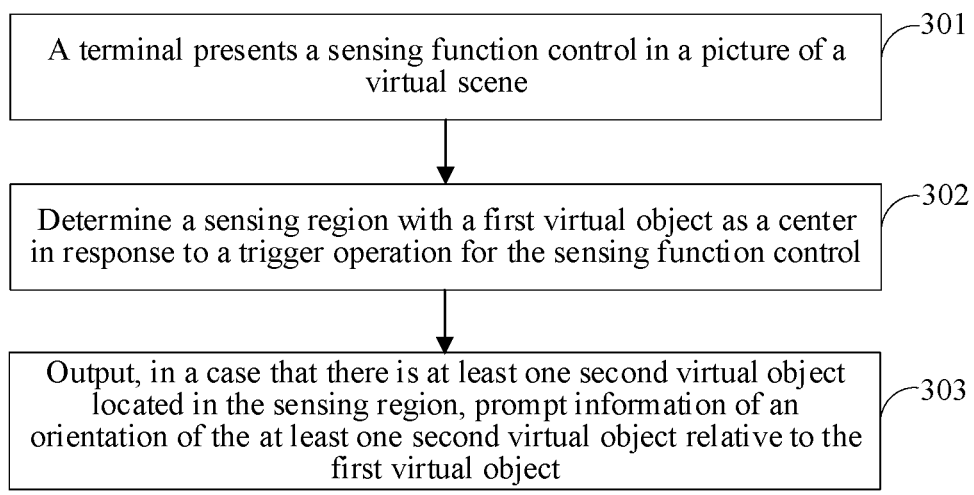
FIG. 3 is a schematic flowchart of an information prompt method in a virtual scene according to an embodiment of the present disclosure.

FIG. 3 is a schematic flowchart of an information prompt method in a virtual scene according to an embodiment of the present disclosure. In some embodiments, the information prompt method in the virtual scene can be separately implemented by the server or the terminal, or collaboratively implemented by the server and the terminal. Using the terminal implementation as an example, the information prompt method in the virtual scene provided in this embodiment of the present disclosure includes the following steps.

Step 301. The terminal presents a sensing function control in a picture of the virtual scene.

The terminal is installed with an application client that supports the virtual scene. When the user opens the application client on the terminal and the terminal runs the application client, the terminal presents a picture of the virtual scene (such as a shooting game scene). The virtual scene may be a two-dimensional virtual scene or a three-dimensional virtual scene. The picture of the virtual scene may be obtained by observing the virtual scene from a viewing angle of a first-person virtual object or a viewing angle of a third-person virtual object, and the virtual object is a virtual image in the virtual scene corresponding to a current user account. In the virtual scene, the user can control the virtual object to perform actions through the picture (such as an object interaction interface) of the virtual scene. In actual implementation, the virtual object can hold a virtual prop, and the virtual prop may be any prop used when the virtual object interacts with other virtual objects, such as a virtual gun, a virtual bow and arrow, a virtual slingshot, a virtual nunchuck, a virtual whip, or the like. The user can control the virtual object to interact with other virtual objects based on the picture of the virtual scene displayed by the terminal.

In practical applications, the virtual object may have at least one virtual prop or virtual skill, and the user can control the virtual object to select the virtual prop and the virtual skill to be worn or equipped from the at least one virtual prop or virtual skill. In practical applications, a corresponding operation control is set for each virtual prop or virtual skill. When the operation control is in an activated state, the user can trigger the operation control through an operation such as clicking, so as to implement wearing and equipment of the corresponding virtual prop or virtual skill.

In this embodiment of the present disclosure, a virtual skill that can sense a distance and a relative orientation between virtual objects and perform prompting is provided for the virtual scene, and a corresponding operation control is set for the virtual skill. In practical applications, after the user enters the virtual scene based on an operation of the view interface, the operation control corresponding to the virtual skill, that is, the sensing function control, is presented in the picture of the virtual scene (such as the object interaction interface of the virtual scene or a setting interface of the virtual scene).

In some embodiments, after presenting the sensing function control, the terminal can further display the function of the sensing function control to the user in the following manner: receiving a viewing instruction for the sensing function control triggered based on the sensing function control; and presenting function description information of the sensing function control in response to the viewing instruction.

In practical applications, the terminal may present operation controls corresponding to a plurality of virtual skills or virtual props in the picture of the virtual scene. The user can trigger the operation controls by operations such as clicking to learn more about the virtual skills or the virtual props corresponding to the operation controls. When receiving a viewing instruction for the sensing function control triggered by (for example, triggered by clicking the sensing function control) the user based on the sensing function control the terminal presents the function description information corresponding to the sensing function control in response to the viewing instruction. Through the function description information, the effects, functions, and a usage method of the sensing function control are displayed to the user.

Figure 4:
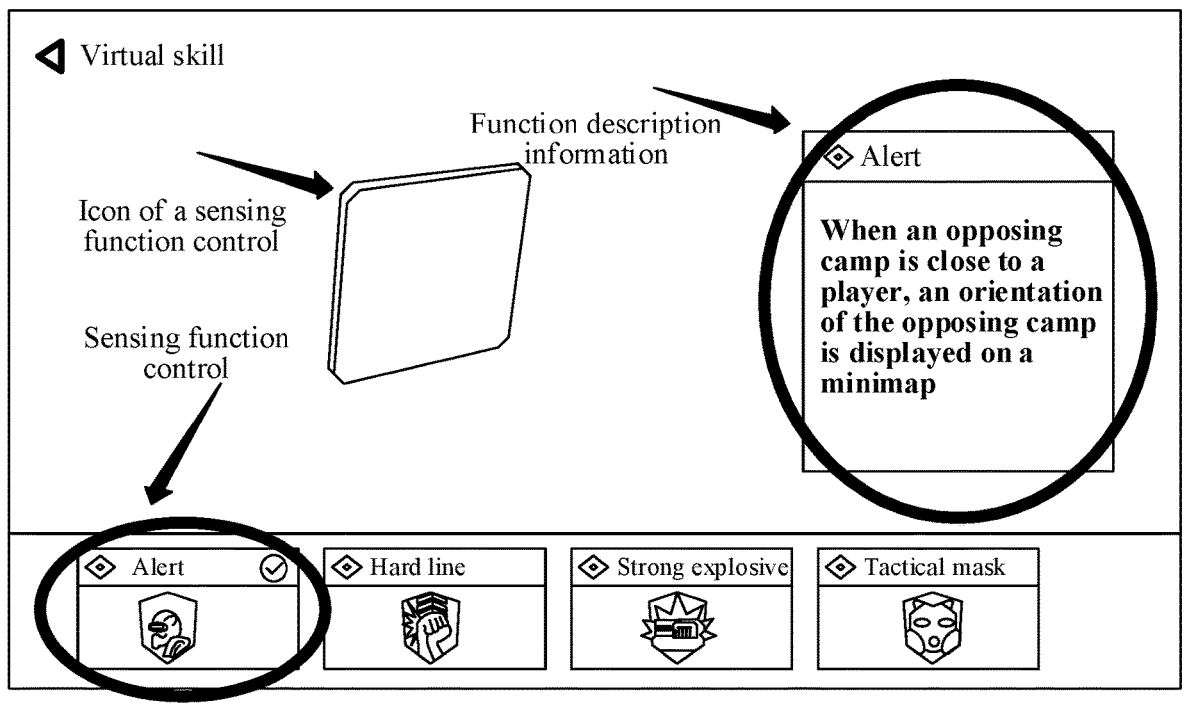
FIG. 4 is a schematic diagram of a presentation of a sensing function control according to an embodiment of the present disclosure.

FIG. 4 is a schematic diagram of a presentation of a sensing function control according to an embodiment of the present disclosure. The terminal presents operation controls corresponding to a plurality of virtual skills in the picture of the virtual scene, such as operation controls corresponding to "alert", "hard line", "strong explosive", or the like. The "alert" operation control is the sensing function control. When receiving the viewing instruction triggered by the user by clicking on the "alert" sensing function control, the terminal presents the function description information corresponding to the sensing function control in the picture of the virtual scene, that is, the function description information shown in FIG. 4 "When an opposing camp is close to the player, an orientation of the opposing camp is displayed on a minimap". In addition, an icon corresponding to the sensing function control is also presented to show a form of the sensing function control.

Step 302. Determine a sensing region with a first virtual object as a center in response to a trigger operation for the sensing function control.

The first virtual object may be a virtual image of the user corresponding to the current virtual scene. In practical applications, the second virtual object is another virtual object different from the first virtual object located in the current virtual scene and can interact with the first virtual object; and the second virtual object may be a virtual image corresponding to other users in the virtual scene, an artificial intelligence set in a battle of the virtual scene through training, or a non-player character set in the interaction in the virtual scene.

After the terminal presents the sensing function control in the picture of the virtual scene, the user can trigger the trigger operation for the sensing function control through an operation such as clicking, so as to implement the equipment of the virtual skill corresponding to the sensing function control. When receiving the trigger operation of the user for the sensing function control, the terminal equips the first virtual object corresponding to the user with the virtual skill corresponding to the sensing function control in response to the trigger operation, so that the first virtual object obtains a function of sensing a distance with other virtual objects and a function of orientations of other virtual objects relative to the first virtual object in the virtual scene. In this case, the terminal determines a sensing region with the first virtual object as the center to sense whether other virtual objects different from the first virtual object enter the sensing region.

In some embodiments, the terminal may determine the sensing region with the first virtual object as the center in the following manner: obtaining an object position of the first virtual object in the virtual scene, and a target sensing distance corresponding to the first virtual object in response to the trigger operation for the sensing function control; and determining the sensing region with the first virtual object as the center by using the object position as a center and the target sensing distance as a radius.

The sensing region may be a circular region with the first virtual object as the center. When receiving the trigger operation of the user for the sensing function control, the terminal obtains an object position of the first virtual object in the virtual scene in response to the trigger operation. In practical applications, the target sensing distance of the corresponding sensing region may further be preset for the first virtual object. Based on this, when determining the sensing region, the terminal may further obtain the preset target sensing distance of the first virtual object. Further, after obtaining the object position of the first virtual object in the virtual scene, the terminal determines the sensing region with the first virtual object as the center by using the object position as a center and the target sensing distance as a radius.

In practical applications, the sensing region may further be determined in the following manner: presetting a size (for example, area) and a shape of the sensing region of the first virtual object. Based on this, a pre-sized sensing region with a symmetrical shape is determined with the first virtual object as a center, such as a square sensing region, an equilateral triangle sensing region, or the like.

In some embodiments, the terminal may determine whether there is a second virtual object in the sensing region of the first virtual object in the following manner: obtaining the first object position of the first virtual object, and the second object position of each of the second virtual objects; respectively determining a distance between each of the second virtual objects and the first virtual object based on the first object position and the second object position; and determining that the second virtual object is in the sensing region when the distance between the second virtual object and the first virtual object is less than the target sensing distance.

In practical applications, the terminal may obtain the first object position of the first virtual object in the virtual scene, and the second object position of each of the second virtual objects in the virtual scene; respectively determine a distance between each of the second virtual objects and the first virtual object based on the first object position and the second object position; and determine that the second virtual object is located in the sensing region when the distance between the second virtual object and the first virtual object is less than the target sensing distance. In this case, orientation prompt information needs to be outputted to the user corresponding to the first virtual object, so as to prompt the second virtual object in the sensing region about the orientation relative to the first virtual object.

In some embodiments, the terminal may present the sensing region of the first virtual object in the following manner: presenting a region contour line of the sensing region with the first virtual object as the center in the picture of the virtual scene, to indicate a range of the sensing region through the region contour line.

Figure 5A:
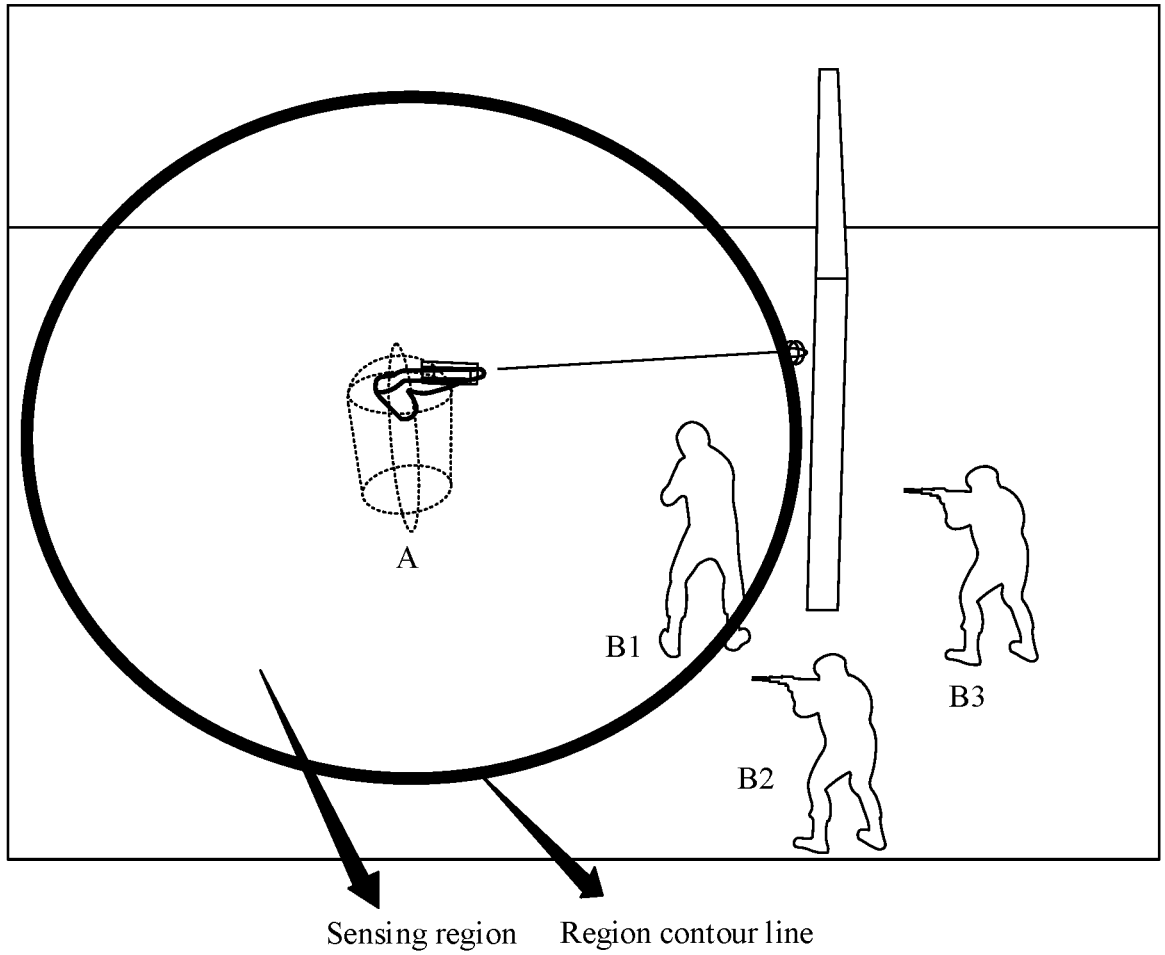
FIG. 5A is a schematic diagram 1 of a presentation of a sensing region in a virtual scene according to an embodiment of the present disclosure.

In practical applications, the picture of the virtual scene can be obtained by observing the virtual scene from a third-person viewing angle. In this case, the terminal may present a region contour line of the sensing region with the first virtual object as the center in the picture of the virtual scene, to indicate a range included in the virtual scene of the sensing region through the region contour line. In actual implementation, the region contour line of the sensing region can be presented in real time along with a moving process of the first virtual object, or can also be presented in real time when there is the second virtual object in the sensing region. FIG. 5A is a schematic diagram 1 of a presentation of a sensing region in a virtual scene according to an embodiment of the present disclosure. The terminal presents the first virtual object A and the second virtual objects B1, B2 and B3 in the picture of the virtual scene; and presents the region contour line (as shown in a thick line in FIG. 5A) of the sensing region with the first virtual object A as a center. The second virtual object B1 is located inside the sensing region, and B2 and B3 are located outside the sensing region.

In some embodiments, the terminal may present the sensing region of the first virtual object in the following manner: presenting a map of the virtual scene in the picture of the virtual scene; and present the object identifier corresponding to the first virtual object and the region contour line of the sensing region with the object identifier as the center in the map along with a moving process of the first virtual object.

Figure 5B:
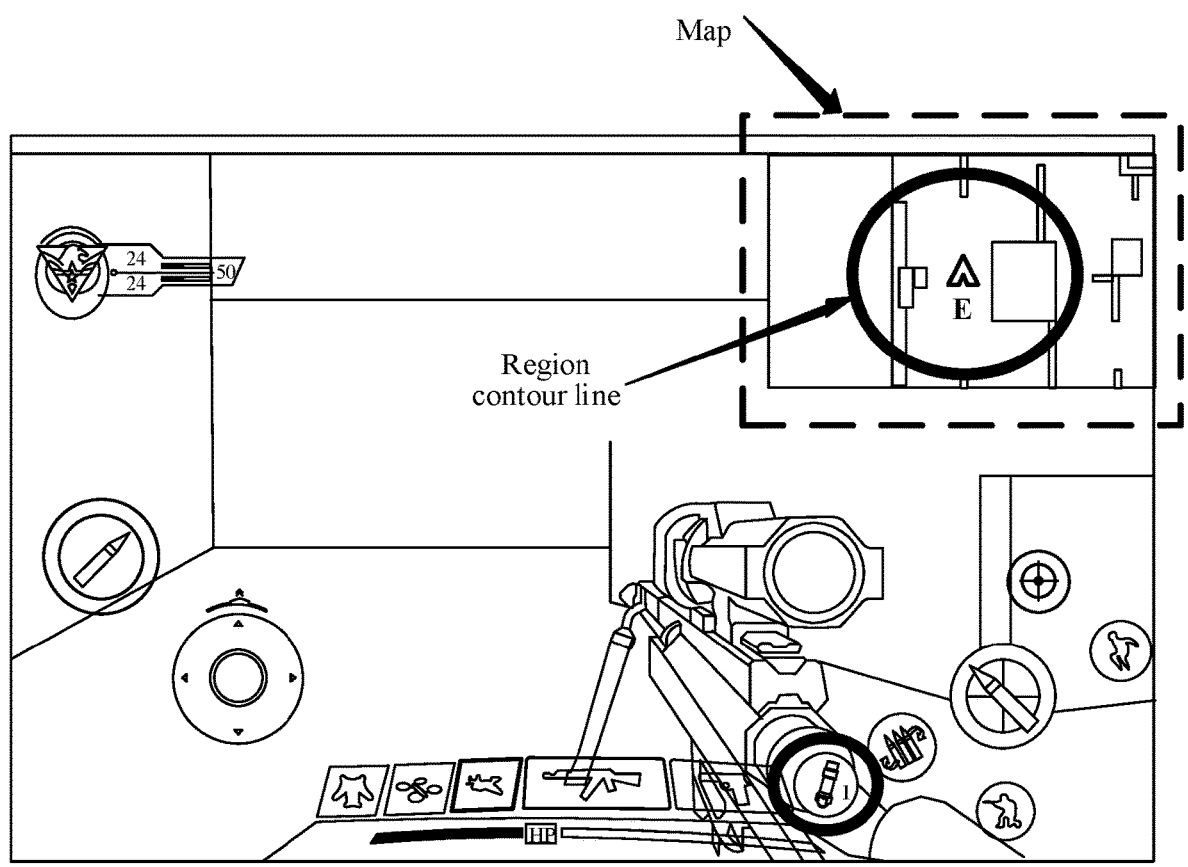
FIG. 5B is a schematic diagram 2 of a presentation of a sensing region in a virtual scene according to an embodiment of the present disclosure.

In practical applications, the picture of the virtual scene can be obtained by observing the virtual scene from a first-person viewing angle. In this case, the terminal may present a map of the virtual scene in the picture of the virtual scene, and then present the region contour line of the sensing region through the map of the virtual scene. In practical applications, the terminal may present the object identifier of the first virtual object and the region contour line of the sensing region with the object identifier as the center in the map along with a moving process of the first virtual object. FIG. 5B is a schematic diagram 2 of a presentation of a sensing region in a virtual scene according to an embodiment of the present disclosure. The terminal presents a map of the virtual scene (as shown in an upper right corner in FIG. 5B) in the picture of the virtual scene, and presents an object identifier E of the first virtual object and the region contour line (as shown in a thick line in a map part in FIG. 5B) of the sensing region with the object identifier E as the center in the map.

Step 303. Output, when there is at least one second virtual object located in the sensing region, prompt information of an orientation of the at least one second virtual object relative to the first virtual object.

When determining that there is at least one second virtual object located in the sensing region, the terminal outputs the orientation prompt information to the user corresponding to the first virtual object to prompt the orientation of the at least one second virtual object relative to the first virtual object.

In some embodiments, the terminal may output the orientation prompt information in the following manner: presenting a map of the virtual scene in the picture of the virtual scene; and presenting a first object identifier of the first virtual object and a second object identifier of the at least one second virtual object in the map, where a position of the first virtual object in the virtual scene corresponds to a position of the first object identifier in the map, and a position in the virtual scene in which the second virtual object is located corresponds to a position of the second object identifier in the map; and a relative position relationship between the first object identifier and the second object identifier in the map indicates the orientation of the second virtual object relative to the first virtual object in the virtual scene.

In practical applications, the terminal may present a map corresponding to the virtual scene in the picture of the virtual scene, and the map may be a map thumbnail of the virtual scene, a two-dimensional map, or a three-dimensional map. In this way, the terminal presents a first object identifier of the first virtual object and a second object identifier of the at least one second virtual object in the map of the virtual scene. A position of the first virtual object in the virtual scene corresponds to a position of the first object identifier in the map, and a position of the second virtual object in the virtual scene also corresponds to a position of the second object identifier in the map; and a relative position relationship between the first object identifier and the second object identifier presented in the map indicates an orientation of the second virtual object relative to the first virtual object in the virtual scene.

Figure 6:
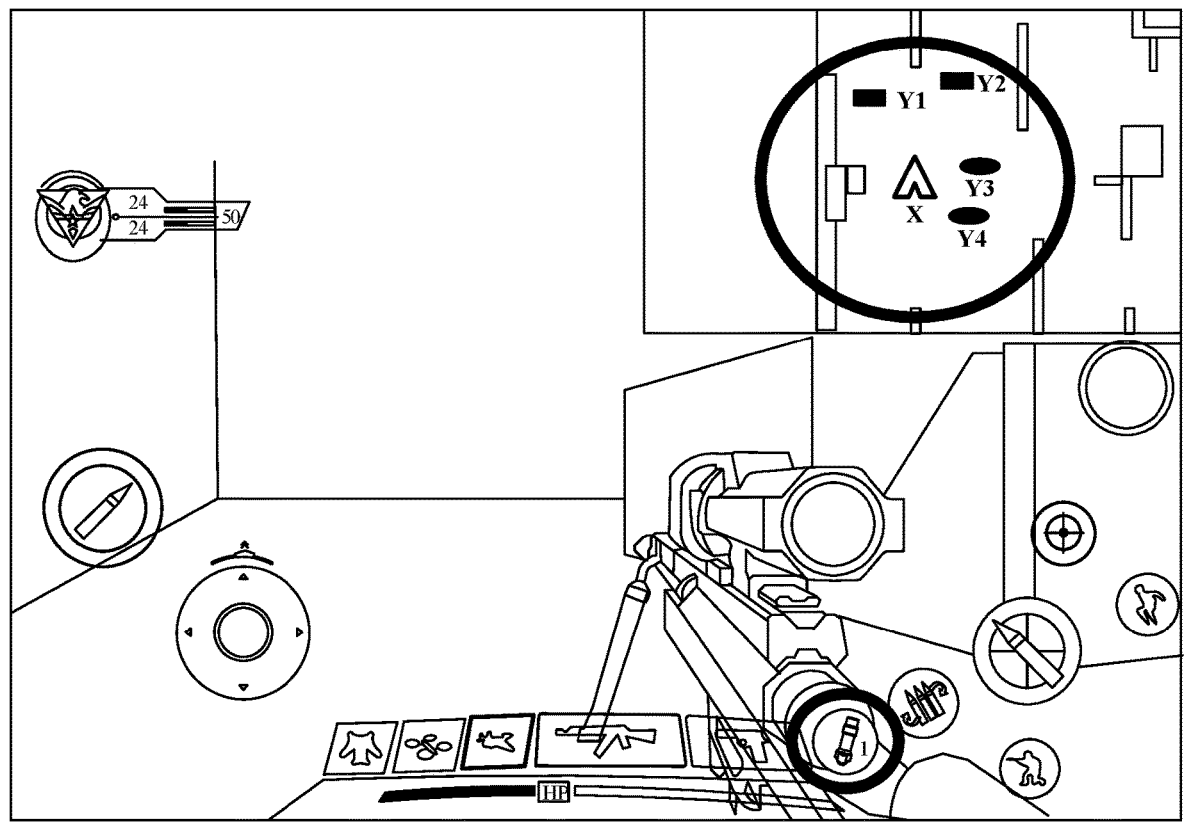
FIG. 6 is a schematic diagram of a presentation of orientation prompt information according to an embodiment of the present disclosure.

FIG. 6 is a schematic diagram of a presentation of an orientation prompt information according to an embodiment of the present disclosure. In the map of the virtual scene, the first object identifier is presented by an arrow icon X, and the second object identifier is presented by square icons Y1 and Y2, and oval icons Y3 and Y4. Certainly, in actual implementation, the second object identifier may be presented by the same icon, which is not limited in the present disclosure.

In some embodiments, the terminal can present indication information used for indicating a viewing angle orientation of the first virtual object in the virtual scene in the map, where the indication information indicates an orientation of the second virtual object relative to the first virtual object in combination with the second object identifier by using the viewing angle orientation of the first virtual object as a reference.

The terminal may further present indication information used for indicating a viewing angle orientation of the first virtual object in the virtual scene in the map, for example, present by an object identifier with an indication arrow. As shown in an arrow icon X in FIG. 6, the arrow icon points forward, which indicates that a viewing angle orientation of the first virtual object in the virtual scene is also forward. In practical applications, the indication information indicates an orientation of the second virtual object relative to the first virtual object in combination with the second object identifier by using the viewing angle orientation of the first virtual object as a reference. Continuing to refer to FIG. 6, indication information indicating the viewing angle orientation of the first virtual object in the virtual scene is presented by the arrow icon X, that is, a current viewing angle orientation of the first virtual object in the virtual scene is forward. In addition, the second virtual object identifiers Y1 and Y2 are further presented on the top of the arrow icon X, that is, indicating that the second virtual objects corresponding to Y1 and Y2 are located in front of the first virtual object; and the second virtual object identifiers Y3 and Y4 are further presented to the right of the arrow icon X, that is, indicating that the second virtual objects corresponding to Y3 and Y4 are located to the right of the first virtual object.

In some embodiments, the terminal may present the second object identifier of the second virtual object in the following manner: when there is a target virtual object that is in an interaction state with the first virtual object in the at least one second virtual object, presenting a second object identifier corresponding to the target virtual object by using a target display style, so that the second object identifier corresponding to the target virtual object that is in an interaction state is different from a second object identifier corresponding to a second virtual object that is not in an interaction state.

In practical applications, the terminal may further present the object identifier of the second virtual object by using different display styles, so as to distinguish the second object identifier of the second virtual object that is in an interaction state from the second object identifier of the second virtual object that is not in the interaction state. For example, the second object identifier corresponding to the target virtual object that is in the interaction state is presented through a target display style. Continuing to refer to FIG. 6, the second object identifiers Y3 and Y4 of the second virtual object that are in the interaction state are presented by oval icons, and the second object identifiers Y1 and Y2 of the second virtual object that are not in the interaction state are presented by square icons.

In some embodiments, the terminal can output orientation prompt information in the following manner: determining a viewing angle orientation of the first virtual object in the virtual scene; and outputting the prompt information of an orientation of the at least one second virtual object relative to the first virtual object by using the viewing angle orientation of the first virtual object as a reference, where the orientation prompt information indicates an orientation of the at least one second virtual object relative to the first virtual object.

Figure 7:
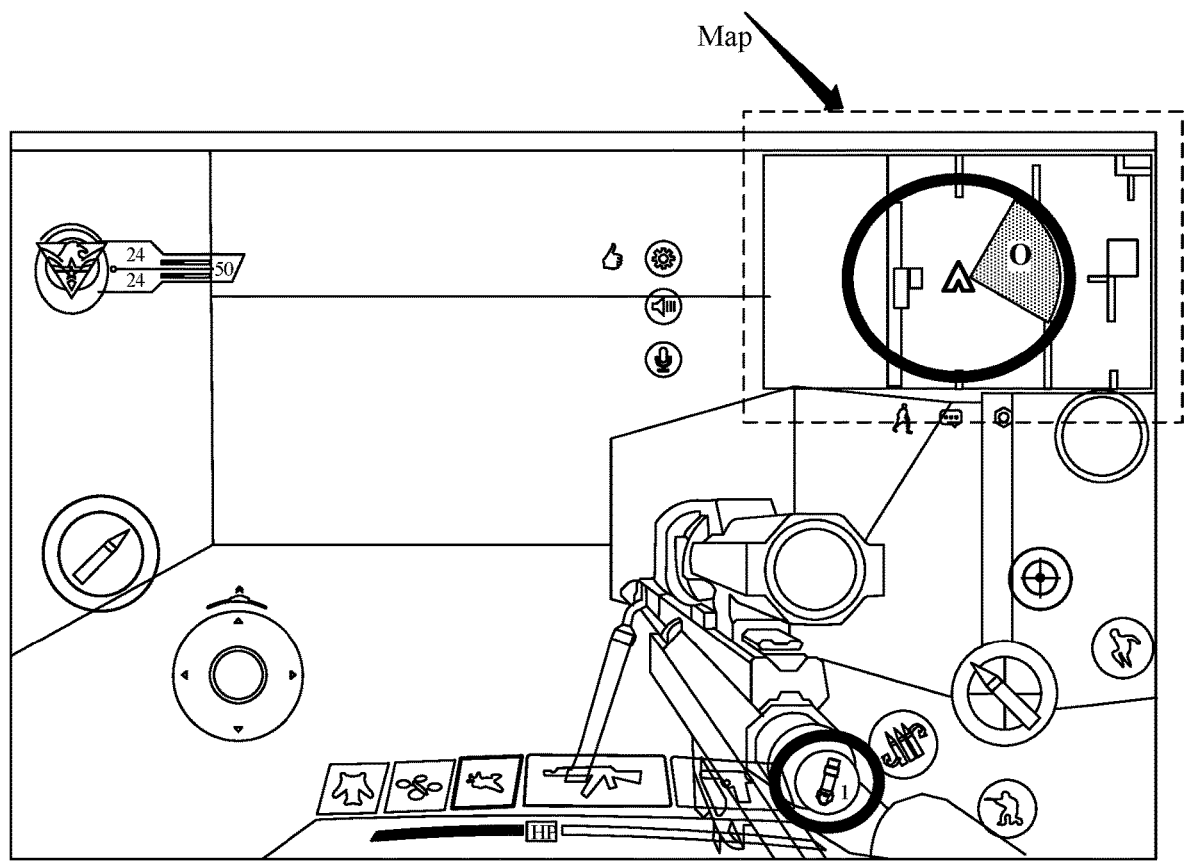
FIG. 7 is a schematic diagram of a presentation of orientation prompt information according to an embodiment of the present disclosure.

In practical applications, the terminal may further obtain the viewing angle orientation of the first virtual object in the virtual scene, and output orientation prompt information of the second virtual object relative to the first virtual object by using the viewing angle orientation of the first virtual object as a reference, so as to indicate the orientation of the second virtual object relative to the first virtual object based on the orientation prompt information. In actual implementation, the orientation prompt information may be directly presented in the picture of the virtual scene, or may be presented through a map in the picture of the virtual scene. FIG. 7 is a schematic diagram of a presentation of an orientation prompt information according to an embodiment of the present disclosure. The orientation prompt information is presented through the map in the picture of the virtual scene; and with the first virtual object as a center, the orientation prompt information is presented in the map through at least four directions (for example, up, down, left, and right). For example, when the sensing region of the first virtual object is a circular region, the orientation prompt information (that is, a fan-shaped shadow region O with the first virtual object as a center in FIG. 7) of a target color is presented in a direction in which there is the second virtual object. That is, a direction "right" in the map indicates that the second virtual object in the virtual scene is located to the right of the first virtual object.

In some embodiments, the terminal can output the orientation prompt information in the following manner: playing orientation prompt audio, where the orientation prompt audio indicates an orientation of the at least one second virtual object relative to the first virtual object; or, presenting an orientation prompt subtitle in the picture of the virtual scene, where the orientation prompt subtitle used for indicating the orientation of the at least one second virtual object relative to the first virtual object.

In practical applications, the orientation prompt audio can be a played text prompt, for example, broadcasting "A second virtual object is behind you" by audio. In actual implementation, if it is detected that the user in the virtual scene wears an audio output device such as a headset, footsteps of the second virtual object moving and sounds during interaction (such as gunshots during shooting) can also be played as the orientation prompt information, so that the user can determine the orientation of the second virtual object by himself.

Figure 8:
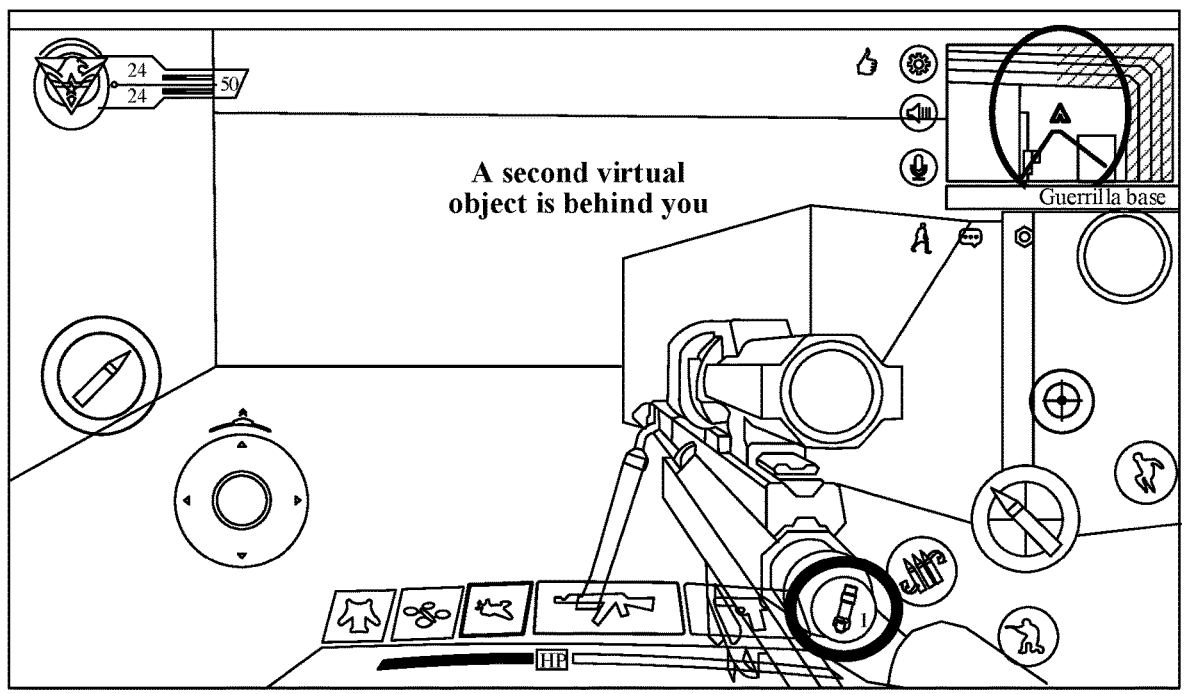
FIG. 8 is a schematic diagram of a presentation of orientation prompt information according to an embodiment of the present disclosure.

In practical applications, the terminal can further present an orientation prompt subtitle in the picture of the virtual scene, for example, present the orientation prompt subtitle in the form of a floating window, a pop-up screen, or a subtitle in a preset region. FIG. 8 is a schematic diagram of a presentation of an orientation prompt information according to an embodiment of the present disclosure. In an upper-middle part of the picture of the virtual scene, an orientation prompt subtitle "A second virtual object is behind you" is presented.

In some embodiments, the terminal can output the orientation prompt information in the following manner: obtaining a relative orientation of the second virtual object and the first virtual object when the first virtual object moves in the virtual scene, or the second virtual object moves in the virtual scene; updating the orientation prompt information of the second virtual object relative to the first virtual object based on the obtained relative orientation; and outputting the updated orientation prompt information.

In practical applications, the user can control the movement of the first virtual object through the terminal, such as the movement of the viewing angle orientation, the movement of the position, or the like. Therefore, the terminal further needs to monitor in real time whether the viewing angle orientation or the position of the first virtual object moves, and further needs to monitor in real time the position of the second virtual object. When the first virtual object or the second virtual object moves in the virtual scene, a relative orientation of the second virtual object and the first virtual object are obtained; and therefore, the orientation prompt information of the second virtual object relative to the first virtual object is updated based on the obtained relative orientation, so as to output the updated orientation prompt information to the user.

Figure 9:
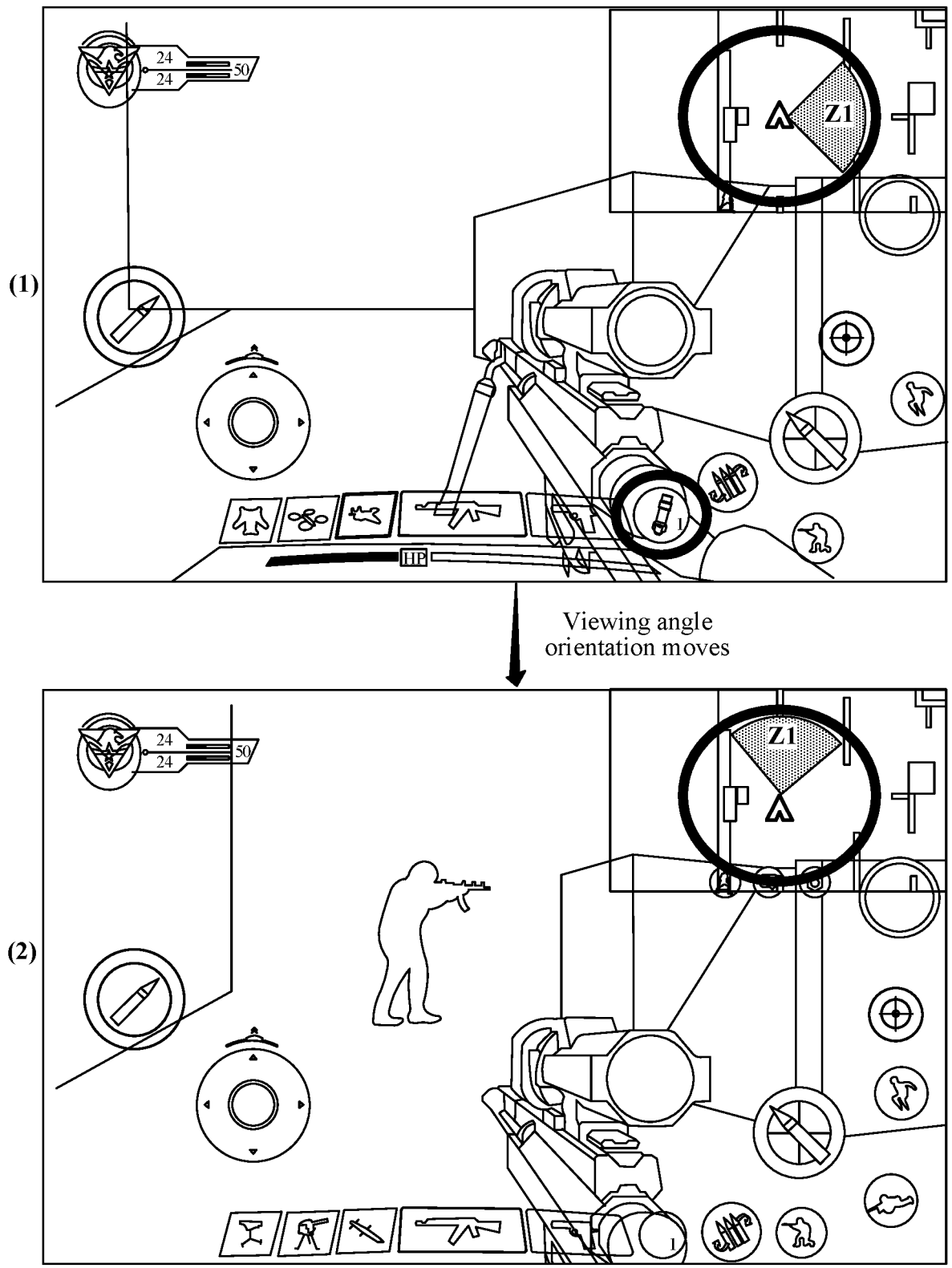
FIG. 9 is a schematic diagram of an update of orientation prompt information according to an embodiment of the present disclosure.

FIG. 9 is a schematic diagram of an update of orientation prompt information according to an embodiment of the present disclosure. As shown in sub-figure (1) in FIG. 9, the orientation prompt information indicates that a current second virtual object Z1 is located to the right of the first virtual object; and when the viewing angle orientation of the first virtual object moves (that is, rotates to the right), the orientation prompt information is updated. As shown in sub-figure (2) in FIG. 9, the updated orientation prompt information indicates that the second virtual object is located in front of the first virtual object.

The foregoing embodiments of the present disclosure are applied. A sensing function control is presented in the picture of the virtual scene, and when a trigger operation for the sensing function control is received, a sensing region with the first virtual object as the center is determined in response to the trigger operation, so that in response to determining that there is at least one second virtual object located in the sensing region, orientation prompt information of the second virtual object relative to the first virtual object is outputted; and in this way, when the user controls the first virtual object to interact with the second virtual object in the virtual scene, the orientation prompt information can be outputted to the user in response to determining that there is the at least one second virtual object in the sensing region of the first virtual object, so as to prompt the user about the orientation of the second virtual object relative to the first virtual object based on the orientation prompt information. In this way, interaction object is reduced, the efficiency of human-machine interaction is improved, and the occupation of hardware processing resources is reduced.

The following describes an exemplary application of this embodiment of the present disclosure in an actual application scenario.

Using a game scene as an example, in a shooting game application, game users are often provided with a plurality of different game interaction modes, such as controlling a virtual object to interact with other virtual objects (such as shooting). Due to the limitation of a size of a terminal screen, most game users often need to perform human-machine interaction operations such as dragging and moving a plurality of times in the virtual scene to adjust a current display field of view, so as to observe other virtual objects (that is, virtual objects corresponding to other game users or non-player characters) that appear nearby. For the game user, the efficiency of human-machine interaction is low, which greatly affects the user experience in the virtual scene.

Figure 10:
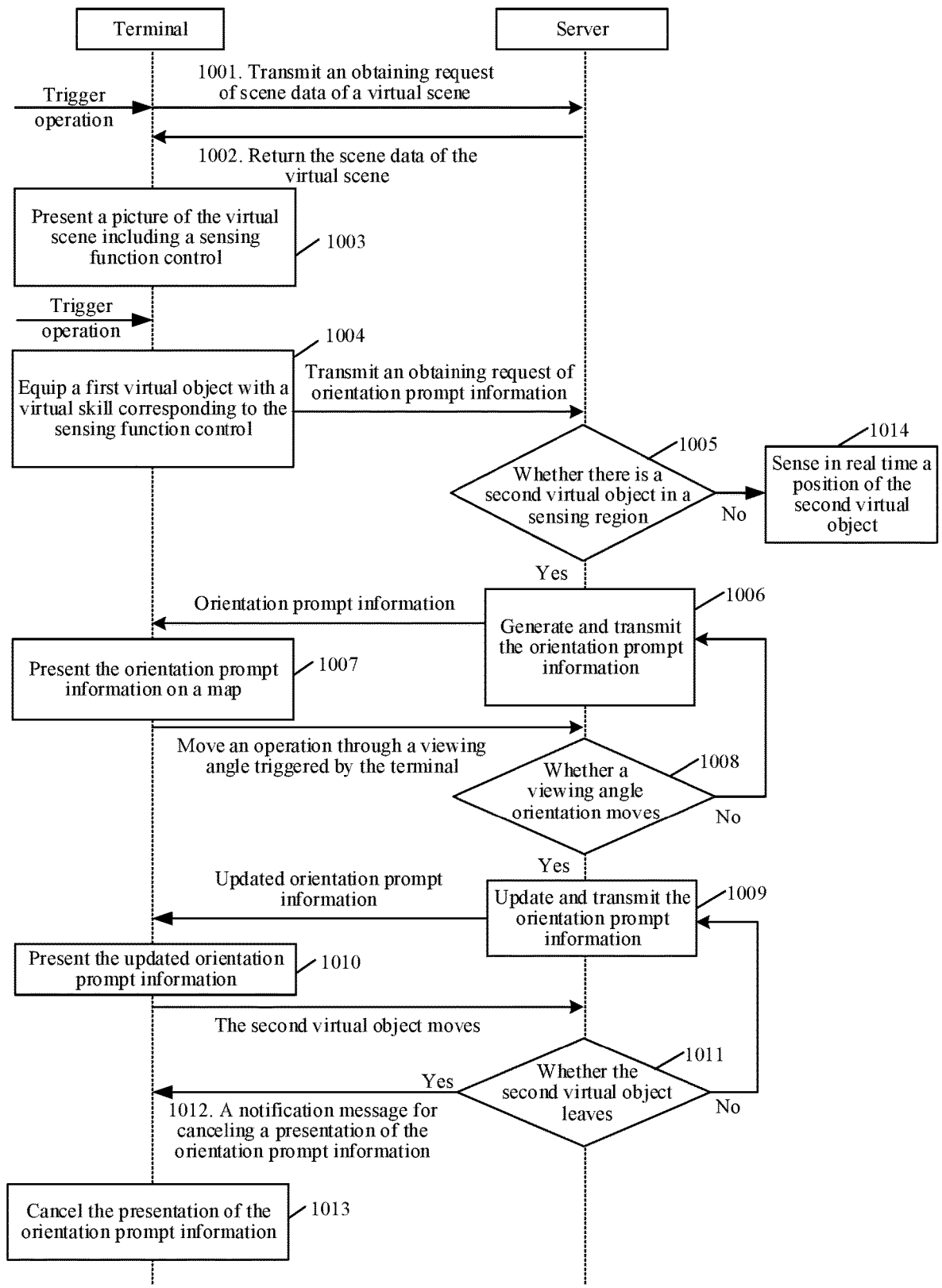
FIG. 10 is a schematic flowchart of an information prompt method in a virtual scene according to an embodiment of the present disclosure.

Based on this, embodiments of the present disclosure provide an information prompt method in a virtual scene, so as to at least resolve the foregoing problems, and the following is a detailed description. The information prompt method in the virtual scene provided in this embodiment of the present disclosure may be collaboratively implemented by the terminal and the server. FIG. 10 is a schematic flowchart of an information prompt method in a virtual scene according to an embodiment of the present disclosure, including the following steps.

Step 1001. The terminal receives a trigger operation for entering the virtual scene based on a view interface, and transmits an obtaining request of scene data of the virtual scene to the server.

Step 1002. The server receives the obtaining request of the scene data, and returns the scene data of the virtual scene to the terminal in response to the obtaining request.

Step 1003. The terminal receives the scene data of the virtual scene, renders a picture of the virtual scene based on the scene data, presents the picture of the virtual scene, and presents the sensing function control in the picture of the virtual scene.

In this embodiment of the present disclosure, a virtual skill that can sense a distance and a relative orientation between virtual objects and perform prompting is provided for the virtual scene, and a corresponding operation control is set for the virtual skill. In practical applications, after the user enters the virtual scene based on an operation of the view interface, the sensing function control corresponding to the virtual skill is presented in the picture (such as the object interaction interface of the virtual scene) of the virtual scene.

FIG. 4 is a schematic diagram of a presentation of a sensing function control according to an embodiment of the present disclosure. The terminal presents operation controls corresponding to a plurality of virtual skills in the picture of the virtual scene, such as operation controls corresponding to "alert", "hard line", "strong explosive", or the like. The "alert" operation control is the sensing function control. When receiving the viewing instruction triggered by the user by clicking on the "alert" sensing function control, the terminal presents the function description information corresponding to the sensing function control in the picture of the virtual scene, that is, the function description information shown in FIG. 4 "When an opposing camp is close to the player, an orientation of the opposing camp is displayed on a minimap". In addition, an icon corresponding to the sensing function control is also presented to show a form of the sensing function control.

Step 1004. Equip the first virtual object with a virtual skill corresponding to the sensing function control in response to the trigger operation for the sensing function control, and transmit an obtaining request for the orientation prompt information of the second virtual object to the server.

The first virtual object may be a virtual image of the user corresponding to the current virtual scene. In practical applications, the second virtual object is another virtual object different from the first virtual object in the current virtual scene and can interact with the first virtual object.

After the terminal presents the sensing function control in the picture of the virtual scene, the user can trigger the trigger operation for the sensing function control through an operation such as clicking, so as to implement the equipment of the virtual skill corresponding to the sensing function control. When receiving the trigger operation of the user for the sensing function control, the terminal equips the first virtual object corresponding to the user with the virtual skill corresponding to the sensing function control in response to the trigger operation, so that the first virtual object obtains a function of sensing a distance with other virtual objects and a function of orientations of other virtual objects relative to the first virtual object in the virtual scene, which is convenient for the first virtual object to discover that the second virtual object is in a hidden state.

In practical applications, the sensing function control can support the first virtual object, sense the distance between the second virtual object and the first virtual object, and the sensing can penetrate a virtual obstacle in the virtual scene, that is, ignore any virtual obstacles and only determine whether the distance meets a sensing range.

Step 1005. The server determines whether there is a second virtual object located in the sensing region with the first virtual object as the center in response to the obtaining request for the orientation prompt information; and if yes, perform step 1006, and if no, perform step 1014.

The sensing region may be a circle with the first virtual object as the center. When receiving the trigger operation of the user for the sensing function control, the terminal obtains an object position of the first virtual object in the virtual scene in response to the trigger operation. In practical applications, the target sensing distance of the corresponding sensing region may further be preset for the first virtual object. Based on this, when determining the sensing region, the terminal may further obtain the preset target sensing distance of the first virtual object. Therefore, the terminal determines the sensing region with the first virtual object as the center by using the object position as a center and the target sensing distance as a radius.

FIG. 5A to FIG. 5B are schematic diagrams of a presentation of a sensing region in a virtual scene according to an embodiment of the present disclosure. As shown in FIG. 5A, a region contour line of the sensing region with the first virtual object as the center is presented in the picture of the virtual scene, to indicate a range of the sensing region through the region contour line. As shown in FIG. 5B, a map of the virtual scene is presented in the picture of the virtual scene; and the object identifier corresponding to the first virtual object and the region contour line of the sensing region with the object identifier as the center is presented in the map along with a moving process of the first virtual object.

The server receives and responds to the obtaining request for the orientation prompt information transmitted by the terminal, obtains the first object position of the first virtual object, and the second object position of each of the second virtual object; respectively determines a distance between each of the second virtual object and the first virtual object based on the first object position and the second object position; and compares the distance between each of the second virtual object and the first virtual object and the target sensing distance to determine whether there is a second virtual object located in the sensing region.

Step 1006. Generate the orientation prompt information of the second virtual object relative to the first virtual object and return to the terminal.

Step 1007: The terminal receives the returned orientation prompt information, and presents the orientation prompt information in the map of the virtual scene.

It is determined that the second virtual object is located in the sensing region when the distance between the second virtual object and the first virtual object is less than the target sensing distance. In this case, the viewing angle orientation of the first virtual object in the virtual scene is determined, and the orientation prompt information of the second virtual object relative to the first virtual object is generated and returned to the terminal by using the viewing angle orientation of the first virtual object as a reference. The orientation prompt information indicates an orientation of the at least one second virtual object relative to the first virtual object.

Figure 11:
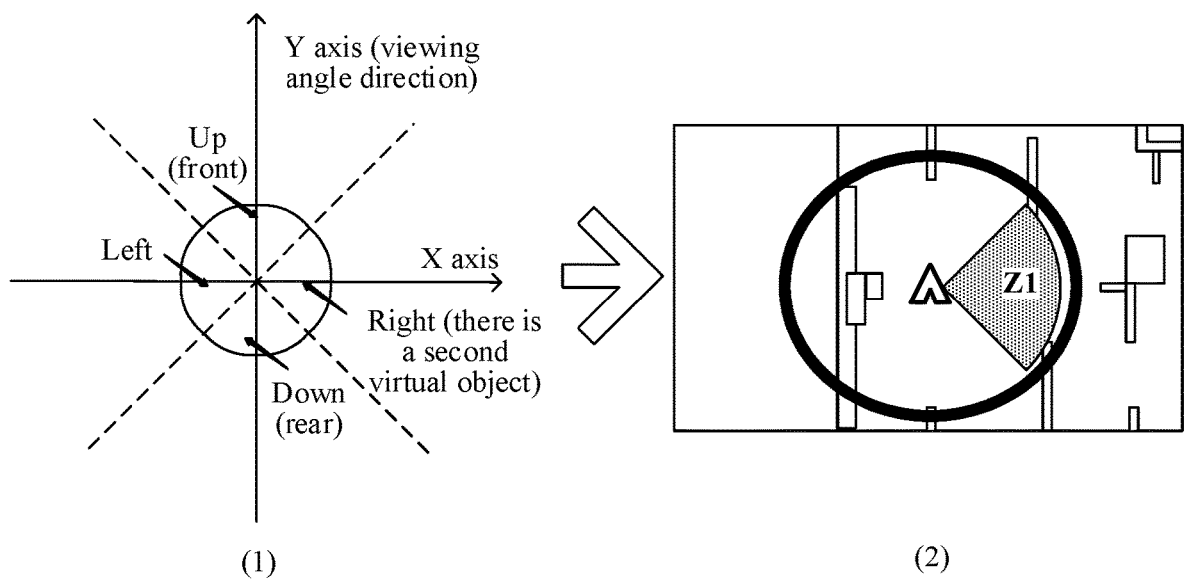
FIG. 11 is a schematic diagram of directions corresponding to a first virtual object according to an embodiment of the present disclosure.

FIG. 11 is a schematic diagram of generating orientation prompt information according to an embodiment of the present disclosure. As shown in sub-picture (1) in FIG. 11, a rectangular coordinate system is established with the first virtual object as an origin, and the viewing angle orientation of the first virtual object is a positive direction of a Y axis. Then a positive direction of an X axis is a right side of the first virtual object, and a coordinate axis is divided into four equal parts, where each equal part is 90 degrees, including four directions such as up (front), down (rear), left, and right. When it is determined which direction the second virtual object is in, a target display style (such as highlighting with a preset color) is used to present a fan-shaped region corresponding to the direction. As shown in sub-picture (2) in FIG. 11, there is a second virtual object Z1 to the right of the first virtual object, and the terminal highlights a fan-shaped region corresponding to the right direction in the map of the virtual scene with a preset color.

Step 1008. The server determines whether the viewing angle orientation of the first virtual object moves, and if yes, performs step 1009, and if no, returns to step 1006.

The user can control the viewing angle orientation of the first virtual object through the terminal. Therefore, the server needs to monitor in real time whether the viewing angle orientation of the first virtual object moves.

Step 1009. Update the orientation prompt information of the second virtual object relative to the first virtual object and return to the terminal.

If the server determines that the viewing angle orientation of the first virtual object moves, the server obtains a relative orientation of the second virtual object and the first virtual object again; and updates the orientation prompt information of the second virtual object relative to the first virtual object and returns to the terminal based on the obtained relative orientation.

Step 1010. The terminal receives the returned updated orientation prompt information, and presents the updated orientation prompt information in the map of the virtual scene.

FIG. 9 is a schematic diagram of an update of orientation prompt information according to an embodiment of the present disclosure. As shown in sub-figure (1) in FIG. 9, the orientation prompt information indicates that a current second virtual object is located to the right of the first virtual object; and when the viewing angle orientation of the first virtual object moves (that is, rotates to the right), the orientation prompt information is updated. As shown in sub-figure (2) in FIG. 9, the updated orientation prompt information indicates that the second virtual object is located in front of the first virtual object.

Step 1011. The server determines whether the second virtual object leaves the sensing region with the first virtual object as the center, and if yes, performs step 1012, and if no, returns to step 1009.

Step 1012. Return a notification message for canceling a presentation of the orientation prompt information.

Step 1013. The terminal receives a notification message for canceling the presentation of the orientation prompt information, and cancels the presentation of the orientation prompt information.

The terminal presents the orientation prompt information until the second virtual object disappears in the sensing region, so that the user can view the orientation of the second virtual object in the sensing region at any time.

Step 1014. Sense in real time the position of the second virtual object.

The foregoing embodiments of the present disclosure are applied. When the user controls the first virtual object to interact with the second virtual object in the virtual scene, the orientation prompt information is outputted to the user in response to determining that there is at least one second virtual object in the sensing region of the first virtual object, so as to prompt the user about the orientation of the second virtual object relative to the first virtual object. In this way, interaction object is reduced, the efficiency of human-machine interaction is improved, and the occupation of hardware processing resources is reduced.

Figure 12:
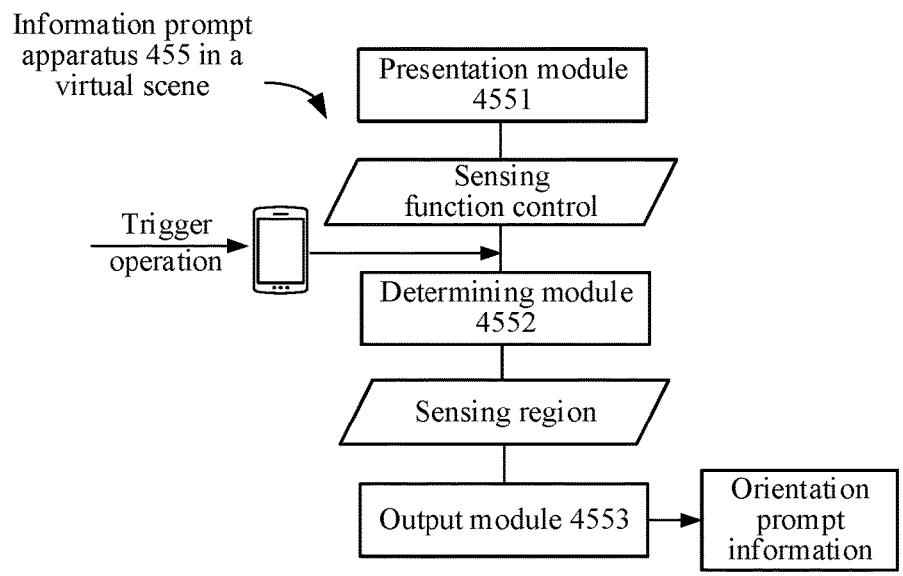
FIG. 12 is a schematic structural diagram of an information prompt apparatus in a virtual scene according to an embodiment of the present disclosure.

The following continues to describe the information prompt apparatus 455 in the virtual scene provided in this embodiment of the present disclosure. In some embodiments, the information prompt apparatus in the virtual scene can be implemented in the form of a software module. FIG. 12 is a schematic structural diagram of an information prompt apparatus 455 in a virtual scene according to an embodiment of the present disclosure. The information prompt apparatus 455 in the virtual scene provided in this embodiment of the present disclosure includes:

a presentation module 4551, configured to present a sensing function control in a picture of the virtual scene;

a determining module 4552, configured to determine a sensing region with a first virtual object as a center in response to a trigger operation for the sensing function control; and an output module 4553, configured to output, when there is at least one second virtual object located in the sensing region, prompt information of an orientation of the at least one second virtual object relative to the first virtual object.

In some embodiments, the presentation module 4551 is further configured to receive a viewing instruction for the sensing function control triggered based on the sensing function control; and present function description information of the sensing function control in response to the viewing instruction.

In some embodiments, the determining module 4552 is further configured to obtain an object position of the first virtual object in the virtual scene, and a target sensing distance corresponding to the first virtual object in response to the trigger operation for the sensing function control; and determine the sensing region with the first virtual object as a center by using the object position as a center and the target sensing distance as a radius.

In some embodiments, the apparatus further includes:

an obtaining module, configured to obtain the first object position of the first virtual object, and the second object position of each of the second virtual object;

respectively determine a distance between each of the second virtual object and the first virtual object based on the first object position and the second object position; and determine that the second virtual object is located in the sensing region when the distance between the second virtual object and the first virtual object is less than the target sensing distance.

In some embodiments, the presentation module 4551 is further configured to present a region contour line of the sensing region with the first virtual object as the center in the picture of the virtual scene, to indicate a range of the sensing region through the region contour line.

In some embodiments, the presentation module 4551 is further configured to present a map of the virtual scene in the picture of the virtual scene; and present an object identifier corresponding to the first virtual object and a region contour line of a sensing region with the object identifier as the center in the map along with a moving process of the first virtual object.

In some embodiments, the output module 4553 is further configured to present a map of the virtual scene in the picture of the virtual scene; and present a first object identifier of the first virtual object and a second object identifier of the at least one second virtual object in the map, where a position of the first virtual object in the virtual scene corresponds to a position of the first object identifier in the map, and a position of the at least one second virtual object in the virtual scene corresponds to a position of the second object identifier in the map; and a relative position relationship between the first object identifier and the second object identifier in the map indicates an orientation of the second virtual object relative to the first virtual object.

In some embodiments, the output module 4553 is further configured to present indication information used for indicating a viewing angle orientation of the first virtual object in the virtual scene in the map, where the indication information indicates the orientation of the second virtual object relative to the first virtual object in combination with the second object identifier by using the viewing angle orientation of the first virtual object as a reference.

In some embodiments, the output module 4553 is further configured to present, when there is a target virtual object that is in an interaction state with the first virtual object in the at least one second virtual object, a second object identifier corresponding to the target virtual object by using a target display style, so that the second object identifier corresponding to the target virtual object that is in an interaction state is different from a second object identifier corresponding to a second virtual object that is not in an interaction state.

In some embodiments, the output module 4553 is further configured to determine a viewing angle orientation of the first virtual object in the virtual scene; and
output the prompt information of an orientation of the at least one second virtual object relative to the first virtual object by using the viewing angle orientation of the first virtual object as a reference, where
the orientation prompt information indicates an orientation of the at least one second virtual object relative to the first virtual object.

In some embodiments, the output module 4553 is further configured to play the orientation prompt audio, where the orientation prompt audio indicates an orientation of the at least one second virtual object relative to the first virtual object; or
present an orientation prompt subtitle in the picture of the virtual scene, where the orientation prompt subtitle used for indicating the orientation of the at least one second virtual object relative to the first virtual object.

In some embodiments, the output module 4553 is further configured to obtain a relative orientation of the at least one second virtual object and the first virtual object when the first virtual object moves in the virtual scene, or the at least one second virtual object moves in the virtual scene;
update the prompt information of an orientation of the at least one second virtual object relative to the first virtual object based on the obtained relative orientation; and
output the updated orientation prompt information.

The foregoing embodiments of the present disclosure are applied. A sensing function control is presented in the picture of the virtual scene, and when a trigger operation for the sensing function control is received, a sensing region with the first virtual object as the center is determined in response to the trigger operation, so that in response to determining that there is at least one second virtual object located in the sensing region, orientation prompt information of the second virtual object relative to the first virtual object is outputted; and in this way, when the user controls the first virtual object to interact with the second virtual object in the virtual scene, the orientation prompt information can be outputted to the user in response to determining that there is the at least one second virtual object in the sensing region of the first virtual object, so as to prompt the user about the orientation of the second virtual object relative to the first virtual object based on the orientation prompt information. In this way, interaction object is reduced, the efficiency of human-machine interaction is improved, and the occupation of hardware processing resources is reduced.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

An embodiment of the present disclosure further provides an electronic device, the electronic device including:
a memory, configured to store computer-executable instructions; and
a processor, configured to implement the information prompt method in a virtual scene provided in this embodiment of the present disclosure when executing the computer-executable instructions stored in the memory.

An embodiment of the present disclosure further provides a computer program product or a computer program. The computer program product or the computer program includes a computer instruction. The computer instruction is stored in a computer-readable storage medium. A processor of a computer device reads the computer instructions from the computer-readable storage medium. The processor executes the computer instructions, to cause the computer device to perform the information prompt method in the virtual scene provided in this embodiment of the present disclosure.

An embodiment of the present disclosure further provides a computer-readable storage medium storing computer-executable instructions, the computer-executable instructions, when executed by a processor, implementing the information prompt method in a virtual scene provided in this embodiment of the present disclosure.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories. The computer device may be various computing devices including an intelligent terminal and a server.

In some embodiments, the computer-executable instructions can be written in the form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the computer-executable instructions may, but do not necessarily, correspond to a file in a file system, and may be stored in a part of a file that saves another program or other data, for example, be stored in one or more scripts in a Hyper Text Markup Language (HTML) file, stored in a file that is specially used for a program in discussion, or stored in a plurality of collaborative files (for example, be stored in files of one or more modules, subprograms, or code parts).

In an example, the computer-executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

What is claimed is:

1. An information prompt method in a virtual scene, performed by a terminal, the method comprising:
presenting a sensing function control and a map of the virtual scene in a picture of the virtual scene;
equipping a first virtual object with a virtual skill corresponding to the sensing function control and determining a sensing region with the first virtual object as a center in response to a trigger operation for the sensing function control, the virtual skill enabling sensing of a distance between a virtual object and the first virtual object and an orientation of the virtual object relative to the first virtual object in the virtual scene, the sensing penetrating and ignoring all virtual obstacles within the sensing region in the virtual scene;
determining a viewing angle orientation of the first virtual object in the virtual scene;
presenting indication information indicating the viewing angle orientation of the first virtual object in the virtual scene in the map; and
when there is at least one second virtual object located in the sensing region, presenting a first object identifier of the first virtual object and at least one second object identifier of the at least one second virtual object in the map and outputting prompt information of an orientation of the at least one second virtual object relative to the first virtual object using the viewing angle orientation of the first virtual object as a reference, the at least one second virtual object being mobile within the virtual scene,
wherein:
a position of the first virtual object in the virtual scene corresponds to a position of the first object identifier in the map, and a position of the at least one second virtual object in the virtual scene corresponds to a position of the at least one second object identifier in the map,
a relative position relationship between the first object identifier and the at least one second object identifier in the map indicates the orientation of the at least one second virtual object relative to the first virtual object, and
the indication information indicates the orientation of the at least one second virtual object relative to the first virtual object in combination with the at least one second object identifier by using the viewing angle orientation of the first virtual object as the reference, and
the method further comprises:
in response to a move of the viewing angle orientation of the first virtual object, updating the prompt information of the orientation of the at least one second virtual object relative to the first virtual object; and
presenting the updated prompt information in the map.

2. The method according to claim 1, wherein after the presenting a sensing function control in a picture of the virtual scene, the method further comprises:
receiving a viewing instruction for the sensing function control triggered based on the sensing function control; and
presenting function description information of the sensing function control in response to the viewing instruction.

3. The method according to claim 1, wherein the determining a sensing region with a first virtual object as a center in response to a trigger operation for the sensing function control comprises:
obtaining an object position of the first virtual object in the virtual scene and a target sensing distance corresponding to the first virtual object in response to the trigger operation for the sensing function control; and
determining the sensing region by using the object position as a center of the sensing region and the target sensing distance as a radius of the sensing region.

4. The method according to claim 1, wherein after the determining a sensing region with a first virtual object as a center, the method further comprises:
presenting a region contour line of the sensing region with the first virtual object as the center in the picture of the virtual scene, to indicate a range of the sensing region through the region contour line.

5. The method according to claim 1, wherein after the determining a sensing region with a first virtual object as a center, the method further comprises:
presenting a map of the virtual scene in the picture of the virtual scene; and
presenting an object identifier corresponding to the first virtual object and a region contour line of a sensing region with the object identifier as a center in the map along with a moving process of the first virtual object.

6. The method according to claim 3, wherein the method further comprises:
obtaining a first object position of the first virtual object and a second object position of each of the at least one second virtual object;
respectively determining a distance between each of the at least one second virtual object and the first virtual object based on the first object position and the second object position; and
determining that one of the at least one second virtual object is located in the sensing region when the distance between the one of the at least one second virtual object and the first virtual object is less than the target sensing distance.

7. The method according to claim 1, wherein the outputting prompt information of an orientation of the at least one second virtual object relative to the first virtual object comprises:
playing orientation prompt audio, wherein the orientation prompt audio indicates the orientation of the at least one second virtual object relative to the first virtual object; or
presenting an orientation prompt subtitle in the picture of the virtual scene, wherein the orientation prompt subtitle indicates the orientation of the at least one second virtual object relative to the first virtual object.

8. The method according to claim 1, wherein after the outputting prompt information of an orientation of the at least one second virtual object relative to the first virtual object, the method further comprises:
obtaining a relative orientation of the at least one second virtual object and the first virtual object when the first virtual object moves in the virtual scene or the at least one second virtual object moves in the virtual scene;
updating the prompt information of the orientation of the at least one second virtual object relative to the first virtual object based on the obtained relative orientation; and
outputting the updated prompt information.

9. The method according to claim 1, wherein the presenting at least one second object identifier of the at least one second virtual object comprises:
when a target virtual object of the at least one second virtual object is interacting with the first virtual object, presenting a target object identifier corresponding to the target virtual object by using a target display style, so that the target object identifier corresponding to the target virtual object is different from a second object identifier corresponding to a second virtual object that is not interacting with the first virtual object.

10. An information prompt apparatus in a virtual scene, comprising:
  a memory, configured to store computer-executable instructions; and
  a processor, configured, when executing the computer-executable instructions stored in the memory, to implement:
    presenting a sensing function control and a map of the virtual scene in a picture of the virtual scene;
    equipping a first virtual object with a virtual skill corresponding to the sensing function control and determining a sensing region with the first virtual object as a center in response to a trigger operation for the sensing function control, the virtual skill enabling sensing of a distance between a virtual object and the first virtual object and an orientation of the virtual object relative to the first virtual object in the virtual scene, the sensing penetrating and ignoring all virtual obstacles within the sensing region in the virtual scene;
    determining a viewing angle orientation of the first virtual object in the virtual scene;
    presenting indication information indicating the viewing angle orientation of the first virtual object in the virtual scene in the map; and
    when there is at least one second virtual object located in the sensing region, presenting a first object identifier of the first virtual object and at least one second object identifier of the at least one second virtual object in the map and outputting prompt information of an orientation of the at least one second virtual object relative to the first virtual object using the viewing angle orientation of the first virtual object as a reference, the at least one second virtual object being mobile within the virtual scene,
  wherein:
  a position of the first virtual object in the virtual scene corresponds to a position of the first object identifier in the map, and a position of the at least one second virtual object in the virtual scene corresponds to a position of the at least one second object identifier in the map,
  a relative position relationship between the first object identifier and the at least one second object identifier in the map indicates the orientation of the at least one second virtual object relative to the first virtual object, and
  the indication information indicates the orientation of the second virtual object relative to the first virtual object in combination with the at least one second object identifier by using the viewing angle orientation of the first virtual object as the reference, and
  the processor further to implement:
    in response to a move of the viewing angle orientation of the first virtual object, updating the prompt information of the orientation of the at least one second virtual object relative to the first virtual object; and
    presenting the updated prompt information in the map.

11. The apparatus according to claim 10, wherein after the presenting a sensing function control in a picture of the virtual scene, the method further comprises:
  receiving a viewing instruction for the sensing function control triggered based on the sensing function control; and
  presenting function description information of the sensing function control in response to the viewing instruction.

12. The apparatus according to claim 10, wherein the determining a sensing region with a first virtual object as a center in response to a trigger operation for the sensing function control comprises:
  obtaining an object position of the first virtual object in the virtual scene and a target sensing distance corresponding to the first virtual object in response to the trigger operation for the sensing function control; and
  determining the sensing region by using the object position as a center of the sensing region and the target sensing distance as a radius of the sensing region.

13. The apparatus according to claim 10, wherein after the determining a sensing region with a first virtual object as a center, the processor is further configured to implement:
  presenting a region contour line of the sensing region with the first virtual object as the center in the picture of the virtual scene, to indicate a range of the sensing region through the region contour line.

14. The apparatus according to claim 10, wherein after the determining a sensing region with a first virtual object as a center, the processor is further configured to implement:
  presenting a map of the virtual scene in the picture of the virtual scene; and
  presenting an object identifier corresponding to the first virtual object and a region contour line of a sensing region with the object identifier as a center in the map along with a moving process of the first virtual object.

15. The apparatus according to claim 12, wherein the processor is further configured to implement:
  obtaining a first object position of the first virtual object and a second object position of each of the at least one second virtual object;
  respectively determining a distance between each of the at least one second virtual object and the first virtual object based on the first object position and the second object position; and
  determining that one of the at least one second virtual object is located in the sensing region when the distance between the one of the at least one second virtual object and the first virtual object is less than the target sensing distance.

16. A non-transitory computer-readable storage medium, storing computer-executable instructions, the computer-executable instructions, when executed by a processor, causing the processor to implement:
  presenting a sensing function control and a map of the virtual scene in a picture of the virtual scene;
  equipping a first virtual object with a virtual skill corresponding to the sensing function control and determining a sensing region with the first virtual object as a center in response to a trigger operation for the sensing function control, the virtual skill enabling sensing of a distance between a virtual object and the first virtual object and an orientation of the virtual object relative to the first virtual object in the virtual scene, the sensing penetrating and ignoring all virtual obstacles within the sensing region in the virtual scene;
  determining a viewing angle orientation of the first virtual object in the virtual scene;
  presenting indication information indicating the viewing angle orientation of the first virtual object in the virtual scene in the map; and when there is at least one second virtual object located in the sensing region, presenting a first object identifier of the first virtual object and at least one second object identifier of the at least one second virtual object in the map and outputting prompt information of an orientation of the at least one second virtual object relative to the first virtual object using the viewing angle orientation of the first virtual object as a reference, the at least one second virtual object being mobile within the virtual scene, wherein:

a position of the first virtual object in the virtual scene corresponds to a position of the first object identifier in the map, and a position of the at least one second virtual object in the virtual scene corresponds to a position of the at least one second object identifier in the map, a relative position relationship between the first object identifier and the at least one second object identifier in the map indicates the orientation of the at least one second virtual object relative to the first virtual object, and the indication information indicates the orientation of the second virtual object relative to the first virtual object in combination with the at least one second object identifier by using the viewing angle orientation of the first virtual object as the reference, and the processor to further implement:
- in response to a move of the viewing angle orientation of the first virtual object, updating the prompt information of the orientation of the at least one second virtual object relative to the first virtual object; and
- presenting the updated prompt information in the map.

* * * * *